United States Patent [19]

Yaginuma

[11] 4,244,817

[45] Jan. 13, 1981

[54] PROCESS FOR PRODUCING SEMIPERMEABLE MEMBRANE

[75] Inventor: Hiroshi Yaginuma, Yokohama, Japan

[73] Assignee: Nippon Zeon Co. Ltd., Tokyo, Japan

[21] Appl. No.: 941,563

[22] Filed: Sep. 12, 1978

[30] Foreign Application Priority Data

Sep. 14, 1977 [JP] Japan ................................ 52/110999

[51] Int. Cl.³ .......................... B01D 13/00; C02F 1/44
[52] U.S. Cl. ............................... 210/654; 210/500.2;
427/400; 427/245
[58] Field of Search .............................. 427/400, 245;
210/500 M, 23 H

[56] References Cited

U.S. PATENT DOCUMENTS

| | | | |
|---|---|---|---|
| 3,686,116 | 8/1972 | Rio | 210/500 M |
| 3,951,815 | 4/1976 | Wrasidlo | 210/500 M |
| 3,960,920 | 6/1976 | Ohotsubo | 260/464 |
| 4,002,563 | 1/1977 | Vogl et al. | 210/500 M |
| 4,005,012 | 1/1977 | Wrasidlo | 210/500 M |
| 4,039,440 | 8/1977 | Cadotte | 210/500 M |

FOREIGN PATENT DOCUMENTS 1441014  6/1976  United Kingdom ................ 210/500 M

*Primary Examiner*—Ronald H. Smith
*Assistant Examiner*—S. L. Childs
*Attorney, Agent, or Firm*—Sherman & Shalloway

[57] ABSTRACT

A process for preparing a semipermeable membrane, which comprises contacting a thin polyamine film applied to a liquid-permeable microporous substrate with a polyalicyclic diisocyanate or polyalicyclic dicarbonyl halide capable of reacting with the amino or imino groups in the polyamine, thereby to crosslink the polyamine at the surface portion of the thin film.

11 Claims, No Drawings

PROCESS FOR PRODUCING SEMIPERMEABLE MEMBRANE

This invention relates to a process for producing a semipermeable membrane suitable for reverse osmosis and ultrafiltration. More specifically, the invention relates to a process for producing a semipermeable membrane of polyamine using a polyalicyclic diisocyanate or polyalicyclic dicarbonyl halide as a crosslinking agent, and to its use in the field of reverse osmosis and ultrafiltration.

Reverse osmosis and ultrafiltration have made a rapid advance in recent years as means for solving the serious problem of worldwide absolute and local shortages of water resources. These techniques are characterized by the fact that because of their principle, the cost of energy is lower than in other separating techniques such as distillation. Thus, methods using a semipermeable membrane have long attracted interest, but no commercial application has ever been made because the efficiency of such methods is extremely low. The first attempt at improving semipermeable membranes was made by S. Loeb and S. Sourirajan who invented the "Loeb-type membranes" (U.S. Pat. No. 3,133,132). Since then much effort has been done to improve semipermeable membranes, and the commercial application of the semipermeable membranes has begun.

The Loeb-type membranes are of the asymmetric type which is characterized by a very thin, dense surface layer or skin that is supported upon an integrally attached, much thicker supporting layer. As a result of development of such membranes, processes have been utilized for preparing a thin film or skin separately from a porous supporting layer, and membranes prepared in such a manner have become known as composite membranes. When preparing such a type of membrane, it is possible to tailor both the thin film and the porous supporting layer in such a manner that each of the components will possess the most desirable properties (British Pat. No. 1,441,014 and U.S. Pat. No. 4,005,012). These methods of preparing a composite semipermeable membrane comprise the steps of (a) treating a microporous substrate with an aqueous solution of polyethylenimine or an amine-modified polyepihalohydrin, (b) contacting the resultant coated microporous substrate with a solution of a polyfunctional agent capable of reacting with the amine groups of said polymer to form a thin film on one surface of said microporous support, and (c) drying said composite semipermeable membrane at an elevated temperature.

This thin film of polyamine has superior water flux and outstanding rejection of inorganic salts and organic polar substances. It is especially noteworthy that this type of polyamine film is effective for the removal of organic polar substances which are difficult to remove by conventional cellulose acetate membranes, for example alcohols such as phenol, benzyl alcohol or ethanol, organic acids such as benzoic acid or acetic acid, and amines such as aniline or pyridine.

This membrane, however, cannot selectively permit permeation of, or reject, a certain substance from an aqueous solution having various different substances typified by organic substances and inorganic salts dissolved therein. It is therefore very significant industrially to make possible such selective permeation or rejection.

The only selective permeation membranes so far disclosed are semipermeable membranes of sulfonted polybenzo-1,3-oxadine-2,4-dione disclosed in Japanese Laid-Open Patent Publication No. 24988/77. OTher prior art references on selective semi-permeable membranes only disclose the selective permeation of water.

It is an object of this invention to overcome the disadvantages of known thin films of polyamine crosslinked with, for example, an aromatic, alicyclic, heterocyclic or aliphatic diisocyanate, or an acid halide, thus making it possible for such thin films to selectively reject an organic polar substance from an aqueous solution containing it in admixture with an inorganic salt.

The object of this invention can be achieved by using a polyalicyclic diisocyanate or a polyalicyclic dicarbonyl halide as a crosslinking agent for the thin polyamine films.

Thus, the present invention provides a new semipermeable membrane obtained by using a polyalicyclic diisocyanate or a polyalicyclic dicarbonyl halide as a crosslinking agent for thin polyamine membrane; and a method of selectively removing or recovering an organic polar substance from an aqueous solution of the organic polar substances and an inorganic salt by using this semipermeable membrane.

Production of a semipermeable membrane in accordance with the process of this invention generally includes the following four steps.

(1) Production of a microporous substrate;

(2) Formation of a thin polyamine film on the microporous substrate;

(3) Crosslinking of the polyamine on the surface portion of the thin film by contacting the thin polyamine film with a polyalicyclic diisocyanate or a polyalicyclic dicarbonyl halide capable of reacting with the amino or imino groups in the polyamine; and (4) Completion of the crosslinking reaction.

These four steps are described in greater detail below.

Step (1) is the production of a microporous substrate. This can be easily achieved by casting from a solution of a polymer such as polyvinyl chloride, polystyrene, polysulfone, and cellulose derivatives either alone or as a mixture. A reinforced microporous substrate can be produced by providing a backing. The backing may be a woven fabric made from polypropylene, rayon, a polymer or copolymer of vinylidene chloride, a polymer or copolymer of acrylonitrile, glass fibers, asbestos fibers, cotton, and polyester fibers. The preparation of these support materials has been described in various pieces of literature and is well known in the art. For example, polysulfone which may be utilized as a microporous substrate in the preparation of the composite semipermeable membrane of the present invention may be prepared by coating a solution of polysulfone in dimethylformamide on a glass plate, followed by immersion in either water, or a few weight percent aqueous dimethylformamide or emulsifier solution to gel the film.

Step (2) is a step of coating a thin polyamine film on the microporous substrate produced by step (1). A method which can be practised easily on a commercial scale is to soak the microporous substrate produced in step (1) for several minutes to several hours in an aqueous solution of polyamine or a solution of a polyamine in a water-containing solvent such as an alcohol/water, and then to remove the substrate from the bath at constant speed. This can also be accomplished by a roll coating method. In either case, the substrate is transferred to the next step either as such or after drying.

Step (3) comprises contacting the thin polyamine film coated on the substrate with a polyalicyclic diisocyanate or a polyalicyclic dicarbonyl halide to crosslink the polyamine in the surface portion of the thin film at its amino or imino groups. The manner of contacting determines the performance of this type of semipermeable membrane. A solution contacting method is especially preferred in view of the ease of uniformly distributing the crosslinking agent on the surface of the thin polyamine film and the ease of controlling the crosslinking density of the surface of the thin film. This can be accomplished, for example, by coating the thin polyamine film obtained in step (2) with a solution of the polyalicyclic diisocyanate or polyalicyclic dicarbonyl halide in a certain solvent which meets the requirements to be described hereinbelow by spraying, roll coating, or brush coating, or by dipping the thin polyamine film in the solution. Selection of the solvent is important. The solvent should (i) not substantially be miscible with the aqueous medium of the polyamine in step (2), and (ii) not dissolve the substrate.

Requirement (i) is essential to the formation of a uniform thin film of polyamine. If a solvent miscible with the aqueous medium of polyamine is used, the polyamine would non-uniformly precipitate on the microporous substrate to make it impossible to prepare the desired composite semipermeable membrane.

Requirement (ii) is essential so as not to cause a change in the pore diameter and proosity of the microporous substrate. If the substrate is dissolved even partly, pinholes will be formed on the thin polyamine film, and become a fatal defect in utilizing it as a membrane.

In step (4), the reaction of the amino or imino groups of the polyamine at the surface portion of the thin film with the diisocyanate or dicarbonyl halide is completed to form a more dense active crosslinked layer on the surface of the thin film. This step can be performed by allowing the membrane to stand at room temperature to 150° C. for about 1 minute to about 1 hour after, if desired, it is dried in the air upon completion of step (3). The usual practice is to heat the membrane in an infrared ray heating oven, a hot air circulating-type heating oven, or the like.

In order to prepare a semipermeable membrane having favorable rejection characteristics, the polyamine should meet the following three requirements.

(1) It should contain a flexible chain as its main chain.
(2) It should have high reactivity with the crosslinking agent.
(3) The distribution of amino or imino groups as reaction sites should be dense.

The polyamine is preferably soluble in water or an aqueous medium in order to produce a composite membrane. It is also important that the polyamine should have a good balance between its hydrophobicity based on carbon atoms and its hydrophilicity based on nitrogen and oxygen atoms in view of its interaction with the crosslinking agent to be described hereinbelow. Polyamines which meet these requirements are, for example, polyethylenimine and polyether polyamines.

Polyethylenimine obtained by cationic ring-opening polymerization of ethylenimine is preferred in regard to requirement (1) because it is branched and has low crystallinity. Polyethylenimine having a molecular weight in the range of 600 to 100,000 is readily available. Preferred polyethylenimine has a molecular weight of at least 6,000.

An example of the polyether polyamine is a water-soluble polyether amine obtained by reacting a polyhalomethyl ether expressed by the general formula

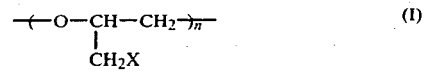

wherein X is Cl or Br and n is an integer, with an aliphatic polyamine having a molecular weight of not more than 200 and containing at least two primary or secondary amino groups per mole of the halomethyl groups of the polyhalomethyl ether. Water-soluble polyether amines obtained by reacting aliphatic polyamines in the same manner as above with polyhalomethyl ethers which are the reaction products between epoxy compounds of the general formula

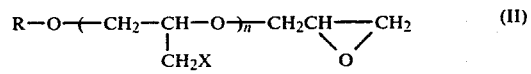

wherein R represents an alkyl group or the group

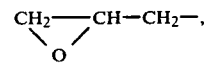

and polyhydric alcohols such as ethylene glycol, glycerol, sorbitol and petaerythritol or polyalkylene glycols such as polyethylene glycol or polypropylene glycol can also be used in this invention.

In view of the strength of the resultant membrane, water-soluble polyether polyamines derived from compounds of formula (I) or (II) in which n is about 50 are preferably used in this invention. From the viewpoint of requirement (3) mentioned above, water-soluble polyether polyamines derived from the polyhalomethyl ethers of general formula (I) are preferred.

The polyalicyclic diisocyanate used as a crosslinking agent in this invention is a compound of the general formula

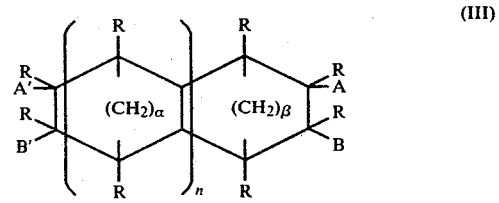

wherein R's are identical or different, and represent a hydrogen atom or a methyl group; one of A and B represents a methyl isocyanate group, and the other represents a hydrogen atom; one of A' and B' represents a methyl isocyanate group, and the other represents a hydrogen atom; n is 0, 1, 2 or 3; and α and β are each 0 or 1, with the proviso that when n is 0, β is 1 or 2. These compounds can be synthesized in accordance with the method disclosed in Japanese Laid-Open Patent Publication No. 131865/76. As described in the Japanese Publication the polyalicyclic diisocyanate of Formula (III) is prepared by reacting a polycyclic diamine of the general formula:

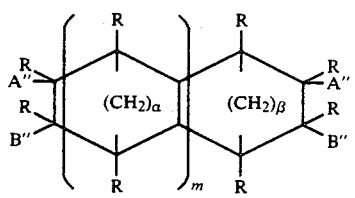

(IV)

in which R, α and β are the same as defined above and one of A''' and B''' represents an aminomethyl radical and the other represents hydrogen, and m represents 1 or 2.

The polyalicyclic diamine of Formula (IV) can be obtained by adding two or three molecules of a conjugated diene such as cyclopentadiene, 1,3-butadiene, 1,3-pentadiene, isoprene, 2,4-hexadiene or the like to acrylonitrile or acrolein or their methyl substituent to form a polycyclic unsaturated compound, hydroformulating an unsaturated radical in the ring and then subjecting the resulting compound to ammono-reduction.

Specific examples of the diisocyanate compounds are bismethanoisocyanates of polyalicyclic compounds having at least 2 covalent carbon atoms such as 2 or 3; 5 or 6-bismethanoisocyanate perhydronorbornene and methyl-substituted derivatives thereof (for example,

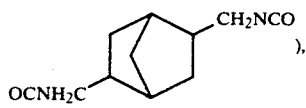

2 or 3;6 or 7-bismethanoisocyanate perhydronaphthalene and methyl-substituted derivatives thereof (for example,

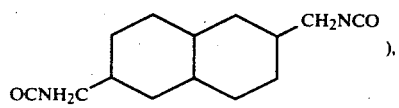

2 or 3;6 or 7-bismethanoisocyanate perhydro-1,4-methanonaphthalene and methyl-substituted derivatives thereof (for example,

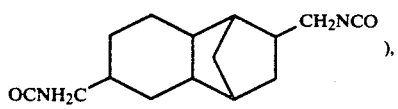

2 or 3;6 or 7-bismethanoisocyanate perhydroanthracene and methyl-substituted derivatives thereof (for example,

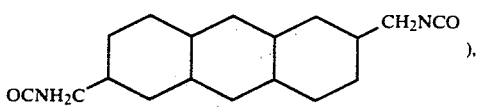

and 2 or 3;6 or 7-bismethanoisocyanate perhydro-1,4;5,8-dimethanonaphthalene and methyl-substituted derivatives (for example,

2 or 3;6 or 7-bismethanoisocyanate perhydro-1,4;5,8;9,10-trimethanoanthracene and methyl-substituted derivatives thereof (for example,

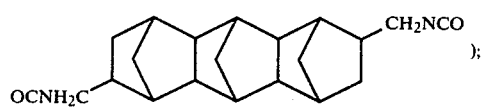

and diisocyanates of perhydroindenes, perhydro-4,7-methanoindenes, perhydrofluorene, perhydroacenaphthylenes, perhydrofluoranthene, perhydropyrene and derivatives of these which have a structure similar to the aforesaid bismethanoisocyanates.

The polyalicyclic dicarbonyl halides used as a cross-linking agent in the present invention are compounds of the above general formula (III) in which R, n, α and β are the same as defined above, one of A and B represents a halocarbonyl group —COX (wherein X is halogen) and the other is a hydrogen atom, and one of A' and B' is a halocarbonyl group —COX (wherein X is halogen) and the other is hydrogen. These compounds can be prepared by various methods, for example a method which comprises adding HCN to an unsaturated polyalicyclic cyano compound in a customary manner, hydrolyzing the addition product using an acid catalyst and converting the product into an acid chloride in accordance with Japanese Laid-Open Patent Publication No. 129544/75; a method which comprises hydroformylating the interring unsaturated groups of a polyalicyclic unsaturated compound by an oxo reaction, and then photo-oxidizing the product with $Cl_2$ to form a dicarboxylic acid chloride in accordance with Japanese Laid-Open Patent Publication No. 80850/76 based on Japanese application number 6111/75; or the method described at pages 859 et seq. of C. A. Buehler and D. E. Pearson, "SURVEY OF ORGANIC SYNTHESES" (Wiley-Interscience, 1970). Examples of these dicarbonyl halides include dicarbonyl halides of polyalicyclic compounds having at least two covalent carbon atoms such as 2 or 3; 5 or 6-dichlorocarbonyl-perhydronorbornene and methyl-substituted derivatives thereof (for example,

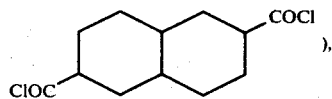

2 or 3; 6 or 7-dichlorocarbonyl perhydro-1,4-methanonaphthalene and methyl-substituted derivatives of these (for example,

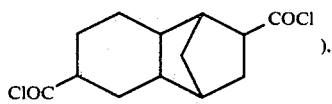

2 or 3; 6 or 7-dichlorocarbonyl perhydroanthracene and methyl-substituted derivatives of these (for example,

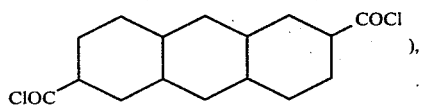), 2 or 3; 6 or 7-dichlorocarbonyl 1,4; 5,8-dimethanonaphthalene and methyl-substituted derivatives thereof (for example,

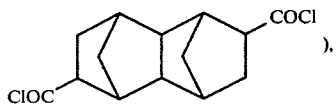), and 2 or 3; 6 or 7-dichloroacarbonyl perhydro-1,4; 5,8; 9,10-trimethanoanthracene and methyl-substituted derivatives of these (for example,

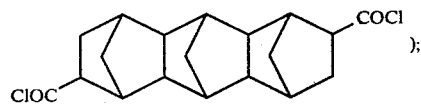);

and dicarbonyl halides of perhydroindene, perhydro-4,7-methanoindene, perhydrofluorene, perhydroacenaphthylene, perhydrofluoranthene, perhydropyrene and derivatives of these, which have a structure similar to the aforesaid dicarbonyl halides.

Since the polyalicyclic diisocyanate and the polyalicyclic dicarbonyl halide have the same solubility in solvents as aliphatic diisocyanates (e.g., hexamethylene diisocyanate), the solution contact method is effectively used in step (3). Having regard to steps (1) and (2), solvents which can be selected for preparing a uniform solution of the polyalicyclic diisocyanate or polyalicyclic dicarbonyl halide are those which have a solubility parameter δ of 6.9 to 8.7 and do not easily form a hydrogen bond. Specific examples of such solvents are n-pentane, hexane, heptane, octane, nonane, decane, cyclopentane, cyclohexane, methylcyclohexane, petroleum ether, and hydrogenated solvent naphtha. The preferred concentration of the polyalicyclic diisocyanate or the polyalicyclic dicarbonyl halide in such a solvent is 0.01 to 10 millimoles/liter of solvent. Within this concentration range, a uniform solution can be obtained, and a composite membrane having favorable characteristics can be produced stably without involving inconveniences such as the occurrence of pinholes and shrinkage. This is one of the characteristics of the present invention. When solvents having a solubility parameter outside this range, for example aromatic solvents or polar solvents, are used, the thin polyamine film shrinks as soon as it contacts the solvents, and pinholes that can be seen with unaided eyes form, thus making it impossible to obtain a composite membrane which can withstand use. The use of the polyalicyclic diisocyanate or polyalicyclic dicarbonyl halide as a crosslinking agent in this invention is very important because a solution contact method which is very advantageous in regard to the properties of the resulting membrane and to commercial practice can be employed in contacting the crosslinking agent with the thin polyamine film in step (3) of the process of the invention.

Another characteristic of this invention is markedly exhibited when the composite membrane produced through the steps (1) to (4) described above is used as a semipermeable membrane. This composite membrane is shown to have a very high flux at a certain rejection and have a high degree of selectivity for organic polar substances when an aqueous solution containing the organic polar substances and inorganic salts is passed through the composite membrane. Thin polyamine films crosslinked with the polyalicyclic dicarbonyl halide are also characteristic in that when a floating solid adheres to the film surface or the pores are clogged during its use in commercial applications, its flux can be regained easily by washing it with hot water, and even when hot water washing is repeated many times, no change occurs in its high selectivity and flux.

It is not entirely clear why the composite membrane of polyamine obtained by using the polyalicyclic diisocyanate or polyalicyclic dicarbonyl halide as a crosslinking agent selectively removes or recovers organic polar substances from an aqueous solution of the organic polar substances and inorganic salts. But in view of a comparison of the results with those obtained in the case of using an aromatic or aliphatic diisocyanate or dicarbonyl halide as a crosslinking agent, the stereochemical characteristic of the crosslinking agent of the invention which is bonded to the polyamine at the surface portion of the thin polyamine film, that is its asymmetry in the surface portion, seems to be the reason for this result.

In any case, it is very significant in commercial applications that the composite membrane of polyamine of this invention crosslinked with the polyalicyclic diisocyanate or polyalicyclic dicarbonyl halide as a crosslinking agent has a high selectivity, a high rejection and a high flux which cannot be obtained by known composite membranes crosslinked with an aromatic, aliphatic or heterocyclic diisocyanate or dicarbonyl halide as a crosslinking agent.

In view of the intent of the present invention, it is apparent that slight modification of the polyamines is within the scope of the present invention. For example, it would be possible to alkylate, cyanoethylate, formalize, carbamoylate, acylate, hydroxylate, or mercaptalize the free amino or imino groups of polyamines before or after production of the composite membrane. Copolyamines and graft polyamines are also useful in the present invention. For example, various ring-opened copolymers prepared by the same method as in the preparation of the aforesaid polyamines by ring-opening polymerization can be used.

The number of functional groups of the polyalicyclic diisocyanate or polyalicyclic dicarbonyl halide used in this invention is limited to two. This is because of restrictions on synthetic methods. It will be easily imagined that if these restrictions are removed as a result of advance in the synthetic methods, polyfunctional isocyanates or carbonyl halides such as tri- or tetra-functional ones would show similar results to those obtained by the present invention.

It should be understood that it is also within the scope of this invention to increase the selectivity of the membrance of this invention for certain molecules by a slight change or modification such as the use of a t-butyl group instead of the methyl group of the polyalicyclic group used in this invention.

The following Examples illustrate the present invention more specifically.

In these examples, water flux in reverse osmosis was measured by using a batch-type device built in accordance with the Sourirajan's device [Ind. Eng. Chem. Process Des. Dev., 9, 5, (1970)] unless otherwise indicated. The inner volume of the upper portion of the cell was about 200 cm³, and 150 cm³ of a solution to be tested was charged into it. The nitrogen pressure was 40 kg/cm², and the available area of the membrane was 19.3 cm². Under the operating pressure, about 30 cc of the test solution was allowed to flow out, and the permeation time of 10 cc of the remaining test solution was measured. The flux of the membrane (gallons/ft²·day; abbreviated "gfd") was calculated on the basis of the measured permeation time. At the same time, the concentration of the solute was measured with regard to the 10 cc test solution, and the residual solution remaining immediately after the flowing out of the 10 cc solution, and the rejection of the membrane was calculated in accordance with the following equation.

$$\text{Rejection of the solute (\%)} = 1 - \left\{ \frac{\text{Solute concentration of the solution that permeated}}{\text{Solute concentration of the residual solution}} \right\} \times 100$$

EXAMPLE 1

A 15% dimethyl formamide solution of polysulfone (P-3500, a product of Union Carbide Corporation) was dripped on one end of a cleaned glass plate (14×55×0.5 cm), and cast over the course of about 2 seconds by a casting blade having a width of 13.6 cm, a gate length of 9.9 cm and a clearance of 0.2 mm. Immediately then, the coated glass plate was dipped in a coagulating bath [demineralized water containing 3% of dimethyl formamide and 0.5% of sodium dodecyl sulfate (in accordance with J. E. Cadotte et al., PB Report 229,337 and 234,198)]. Five minutes later, the glass plate was taken out of the coagulating bath, and washed in a demineralized water bath. This washing operation was repeated three times. The polysulfone film-like substrate which was peeled from the glass plate and was still wet was placed on a stainless steel dish, and a 1% aqueous solution of polyethylenimine (P-1000, a product of Japan Cataytic Co., Ltd.) was poured onto it. After dipping for 10 minutes, the aqueous solution of polyethylenimine was caused to flow out, and the stainless steel dish was maintained perpendicular for 1 minute to allow the excess of the aqueous polyethylenimine solution to drop off. A hexane solution (the concentration 0.3, 0.6, 2.0, and 6.0 millimoles/liter of hexane respectively) of 2 or 3; 6 or 7-bismethanoisocyanate-perhydro-1,4; 8,5-naphthalene

as a crosslinking agent onto the wet thin polyethylenimine film. One minute later the solution was caused to flow out, and the thin film was maintained oblique for 10 minutes in a forced air circulating-type oven at 105° C. It was then taken out of the oven and allowed to cool. From the resulting composite membrane, test samples having a diameter of 6 cm were cut away by a ring-shaped cutter (15 samples were prepared for each concentration of the solution). The same procedure as described above was taken using a hexane solution (the same concentrations as described above) of tolylene 2,4-diisocyanate, and 15 test samples were prepared for each concentration.

A reverse osmosis test was performed on an aqueous solution of NaCl (5,000 ppm) and an aqueous solution (1,000 ppm) of a sodium naphthalenesulfonic acid/formaldehyde condensate (NASF for short) using each of these samples. The results are shown in Table 1. The results of measurements were averages of the measured values of 15 composite membranes in each run.

TABLE 1

| Test items Run No. | | Concentration of the cross-linking agent in hexane (millimoles/liter) | NaCl (5,000 ppm) | | NASF (1,000 ppm) | |
|---|---|---|---|---|---|---|
| | | | Flux (gfd) | Rejection (%) | Flux (gfd) | Rejection (%) |
| Invention | 1 | 0.3 | 160 | 20 | 145 | 90 |
| | 2 | 0.6 | 115 | 32 | 115 | 96 |
| | 3 | 2.0 | 47 | 36 | 42 | 97 |
| | 4 | 6.0 | 18 | 37 | 10 | 98 |
| Comparison | 5 | 0.0 | 200 | 0 | 165 | 79 |
| | 6 | 0.3 | 140 | 42 | 120 | 90 |
| | 7 | 0.6 | 90 | 72 | 80 | 96 |
| | 8 | 2.0 | 43 | 90 | 35 | 99 |
| | 9 | 6.0 | 18 | 95 | 14 | 99.5 |

After the experimentation, the NASF solution was renewed for re-testing, and allowed to stand for 1 week with stirring. Samples of Runs Nos. 1 to 4 and 6 to 9 gave much the same results as in Table 1, but the sample of Run No. 5 showed a flux of 270 gfd and a rejection of 20%. This drastic decrease of rejection means that uncured membranes are very difficult to use commercially.

Selection of NASF as a typical example of the organic polar substance in the above experimentation was based on the fact that although this substance is used commercially in many fields, its biodegradability is very low, and a counter measure against it is in urgent need.

It is seen from the results given in Table 1 that the composite membranes crosslinked with the polyalicyclic diisocyanate in accordance with this invention shows a high flux and a low NaCl rejection but a high NASF rejection and therefore can selectively remove NASF from an aqueous solution containing NACl and NASF, whereas it is difficult with the composite membranes crosslinked with the aromatic diisocyanate.

A reverse osmosis test was conducted on an aqueous solution (1,000 ppm) of sodium 2,7-naphthalenedisulfonate which is considered to be one low-molecular-weight model of NASF using the composite membrane sample in Run No. 3. The pH of the aqueous solution was maintained at 4.0, 7.0, and 9.0, respectively. The results are shown in Table 2.

TABLE 2

| Test items Run No. | pH of the solution | Flux (gfd) | Rejection (%) |
|---|---|---|---|
| 10 | 4.0 | 41 | 98 |
| 11 | 7.0 | 51 | 90 |
| 12 | 9.0 | 44 | 96 |

These results show that the composite membrane of this invention shows a high flux and a high rejection on a low-molecular-weight model compound of NASF, and that it exhibits favorable performance over a wide pH range.

EXAMPLE 2

A 3-liter polymerization flask equipped with a stirrer was charged with 1.4 liters of dehydrated epichlorohydrin and 630 ml of benzene. The flask was fitted to a heating bath, and the temperature of the inside of the flask was adjusted to 50° C. When the temperature was adjusted to 50° C., a benzene solution of $SnCl_4$ as a polymerization catalyst was added dropwise through a dropping funnel. Since it was certain that heat would be generated by the addition of the catalyst, the catalyst solution in a total amount of 35 millimoles were added dropwise in small portions over the course of 5 hours. After the addition, the reaction was continued for 2 hours. Then, 10 ml of methanol was added to stop the polymerization reaction. A sodium hydroxide solution of water/methanol was further added to remove the catalyst residue. The contents of the flask were diluted with benzene, and the catalyst residue in the polymer cement was separated by adsorption using celite-560 (trademark of Johns Manville Corp.) and then filtered. The filtrate was concentrated by a rotary evaporator, and dried in vacuo to recover 890 g of polyepichlorohydrin. The number average molecular weight of the polymer as measured by a vapor pressure osmometer was 4,200.

Ninety-three grams of the polyepichlorohydrin was dissolved in 93 g of dimethyl formamide and 90 g of ethylenediamine. The temperature of the solution was maintained at 100° C., and it was stirred for 5 hours. The solution was then cooled to 30° C., and 135 g of a 30% aqueous solution of sodium hydroxide was added. The mixture was stirred overnight at this temperature, and dried under reduced pressure to recover 117 gr of polyepichlorohydrin modified with ethylenediamine.

The modified polyepichlorohydrin was dissolved in water to form a 1% aqueous solution, and then filtered by a No. 2 filter paper. The filtered aqueous solution was poured onto a film-like polysulfone substrate prepared by the same operation as in Example 1. After dipping for 10 minutes, the aqueous solution was removed, and the substrate was contacted for 10 minutes with a hexane solution of 2 or 3; 6 or 7-bismethanoisocyanate perhydro-1,4; 9,10-dimethanoanthracene

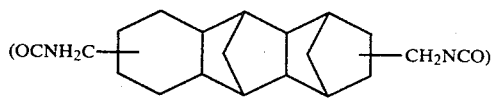

as a crosslinking agent (concentration, 0.3, 0.6, 2.0, 6.0 millimoles/liter of hexane, respectively). After removing the solution, the substrate was heated for 10 minutes in a forced air circulating-type oven (110° C.) to form composite membranes of the invention. Similarly, composite membranes of comparative examples were produced by using hexamethylene diisocyanate as the crosslinking agent.

The same aqueous solutions of NaCl and NASF as used in Example 1 were subjected to a reverse osmosis test using these composite membranes. The results are shown in Table 3.

TABLE 3

| Test items<br>Run No. | | Concentration of the crosslinking agent in the hexane solution (mmoles/l) | NaCl (5,000 ppm) | | NASF (1,000 ppm) | |
|---|---|---|---|---|---|---|
| | | | Flux (gfd) | Rejection (%) | Flux (gfd) | Rejection (%) |
| Invention | 13 | 0.3 | 104 | 22 | 78 | 93 |
| | 14 | 0.6 | 81 | 29 | 53 | 98 |
| | 15 | 2.0 | 47 | 35 | 28 | 98 |
| | 16 | 6.0 | 31 | 36 | 12 | 98 |
| Comparison | 17 | 0 | 160 | 0 | 120 | 70 |
| | 18 | 0.3 | 116 | 27 | 93 | 78 |
| | 19 | 0.6 | 80 | 49 | 60 | 90 |
| | 20 | 2.0 | 43 | 69 | 28 | 94 |
| | 21 | 6.0 | 30 | 78 | 22 | 94 |

After the experimentation, the NASF solution was renewed for re-testing, and allowed to stand for 1 week with stirring. Samples excepting the sample of Run No. 17 gave almost the same results as those given in Table 3. The sample of Run No. 17 which was an uncured membrane showed a markedly reduced rejection and a markedly increased flux, and was found to be substantially useless.

The results given in Table 3 demonstrate that since the composite membranes crosslinked with the polyalicyclic diisocyanate in accordance with this invention show a low NaCl rejection and a high NASF rejection, they can selectively remove NASF, whereas the composite membranes crosslinked with the aliphatic diisocyanate also show a high NaCl rejection but selective removal of NASF is difficult.

A reverse osmosis test was performed on an aqueous solution (1,000 ppm) of each of organic polar substances shown in Table 4 using the composite membrane sample of Run No. 14. The results are shown in Table 4.

TABLE 4

| Solute | Flux (gfd) | Rejection (%) |
|---|---|---|
| Phenol | 50 | 95 |
| Hydroquinone | 52 | 97 |
| Aniline | 47 | 93 |
| Dimethyl formamide | 56 | 90 |

It is seen from Table 4 that the composite membranes in accordance with this invention show a high flux and a high rejection on aqueous solutions containing low-molecular-weight organic polar substances. When the solute is dimethyl formamide, the tendencies of changes with time of flux and rejection differ from those in the case of the other three solutes. In this case, the flux increases, and the rejection decreases, with the passage of time.

EXAMPLE 3

A composite membrane was produced in the same way as in Example 2 using a hexane solution of 2 or 3; 5 or 6-dismethanoisocyanate perhydro-4,7-methanoindene

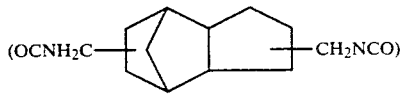

as a crosslinking agent. As a comparison, a composite membrane was prepared in the same way as above except that a hexane solution of 1-isocyanate-3-methanoisocyanate-3,5,5-trimethylcyclohexane

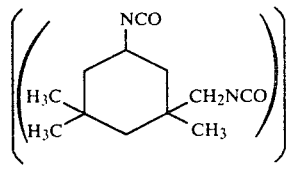

was used as the crosslinking agent. The concentration of the crosslinking agent was 2 millimoles/liter of hexane in each case. The same reverse osmosis test as in Example 1 was performed, and the results are shown in Table 5.

TABLE 5

| Test items Run No. | NaCl (5,000 ppm) | | NASF (1,000 ppm) | |
| --- | --- | --- | --- | --- |
|  | Flux (gfd) | Rejection (%) | Flux (gfd) | Rejection (%) |
| Invention 22 | 46.0 | 31.0 | 32.0 | 98.5 |
| Comparison 23 | 28.0 | 72.0 | 18.0 | 95.5 |

These results demonstrate that monoalicyclic compounds cannot give the high flux and high selectivity which are characteristic of the present invention.

EXAMPLE 4

Composite membranes for reverse osmosis were prepared in the same way as in Example 1 except that the crosslinking agent in Example 1 was replaced by each of the compounds listed below.

EXAMPLE OF THE INVENTION 2 or 3; 6 or 7-bismethanoisocyanate per hydronaphthalene

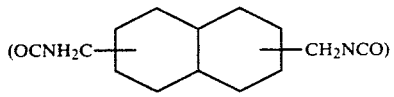

Comparative Examples (A) Perhydrotoluene-2,4-diisocyanate

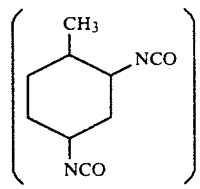

(B) Tolylene diisocyanate

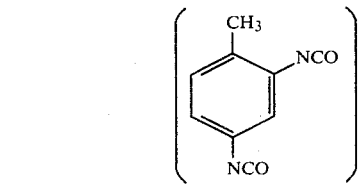

(C) 1,5-Naphthalene diisocyanate

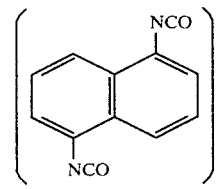

(D) 4,4'-Diphenylmethane diisocyanate

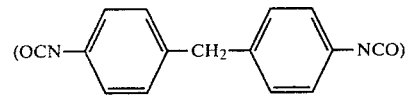

Each of these crosslinking agents was used as a hexane solution in a concentration of 5 millimoles/liter of hexane.

Attempts were made to dissolve the crosslinking agent of Comparative Example (C) in many solvents including aliphatic and aromatic hydrocarbons and polar and non-polar solvents at room temperature. It was found that only conc. sulfuric acid can dissolve this crosslinking agent, and no other solvent can dissolve it when used singly at room temperature. This crosslinking agent showed a slightly turbid suspended state in dimethyl sulfoxide and methyl ethyl ketone. The suspension was therefore heated, but no further dissolution occurred. But it was found that hot ortho-dichlorobenzene can dissolve this crosslinking agent. Thus, an attempt was made to crosslink the polyamines in Examples 1 and 2 using a hot solution of this crosslinking agent in ortho-dichlorobenzene in a concentration of 2 millimoles/liter of ortho-dichlorobenzene. In each case, shrinkage of the polyamine film took place as soon as it was contacted with the ortho-dichlorobenzene solution. The resulting products had numerous raised and depressed portions and pinholes perceptible with unaided eyes, and could not be used in experiments.

The crosslinking agent of Comparative Example (D) did not dissolve in an aliphatic hydrocarbon solvent, but dissolved in hot toluene. Thus, a solution of this crosslinking agent in toluene in a concentration of 2 millimoles/liter of toluene was contacted with the polyamine film in Examples 1 and 2. The film was then washed with hexane and heated to form composite membranes. The membranes had considerably raised and depressed portions, but did not contain pinholes that could be detected by unaided eyes. A reverse osmosis test was performed on an aqueous solution of NaCl (5,000 ppm) using these two composite membranes of polyamine in a continuous apparatus described hereinbelow. Both of these composite membranes had a flux of more than 300 gfd, and could not substantially be used as semipermeable membranes.

The apparatus used for the continuous reverse osmosis was an apparatus of the Sourirajan type developed by National Chemical Laboratory in Japan (described in the Japanese-language publication entitled "Water Treatment Experimental Procedures", p. 550, 1971, Corona Co., Ltd. Japan). The operation was continuously performed under the following conditions while returning the residual solution and the permeated solution to the test solution tank.

Available area of the membrane: 8.60 cm$^2$
Testing temperature: 30° C.
Flow rate of the test solution: 20 liters/hr
Operating pressure: 40 kg/cm$^2$ One hour later when a equilibrium was reached, the flux and rejection of the membrane were measured. The experiment was made on an aqueous solution of NaCl (5,000 ppm), an aqueous solution of NaCl (5,000 ppm) and NASF (1,000 ppm), and an aqueous solution of NASF (1,000 ppm).

The results are shown in Table 6.

TABLE 6

| Test items Run No. | NaCl (5000 ppm) | | NaCl (5000 ppm)-NASF (1000 ppm) | | | NASF (1000 ppm) | |
| --- | --- | --- | --- | --- | --- | --- | --- |
| | Flux (gfd) | Rejection (%) | Flux (gfd) | Rejection (%) | | Flux (gfd) | Rejection (%) |
| Invention | | | | (NaCl) - | (NASF) | | |
| 24 | 30.0 | 30.0 | 28.0 | 30.0 | 99.6 | 33.0 | 99.9 |
| Comparative Example | | | | | | | |
| (A) 25 | 18.0 | 84.0 | 15.5 | 84.0 | 96.5 | 19.0 | 97.0 |
| (B) 26 | 15.9 | 98.5 | 13.8 | 99.1 | 99.0 | 16.3 | 99.5 |

These results show that when a polyalicyclic diisocyanate is used as a crosslinking agent in accordance with this invention, the resulting membrane can selectively remove an organic polar substance at a high flux from an aqueous solution of a mixture containing it, whereas high selectivity cannot be obtained when a monoalicyclic diisocyanate or aromatic diisocyanate outside the scope of the invention is used as the crosslinking agent. The experimental results obtained with a mixed solution were naturally what had been expected. Although these was some deviation from the simple addition of the experimental results obtained with solutions each containing a single solute, the results showed a good agreement.

EXAMPLE 5

A hexane solution of 2 or 3; 6 or 7-dichlorocarbonyl perhydro-1,4; 8,5-naphthalene

in a concentration of 2.0 millimoles/liter of hexane as a crosslinking agent was poured onto a wet thin film of polyethylenimine prepared in the same manner as in Example 1. One minute later, the solution was caused to flow out, and the thin film was maintained oblique for 10 minutes in a forced air circulating-type oven (105° C.). Then, it was taken out of the oven, and allowed to cool. Test samples having a diameter of 6 cm were cut away from the resulting composite membrane by a ring-shaped cutter. The same operation was performed using a hexane solution of the corresponding dimethanoisocyanate in the same concentration as above. Ten testing samples were prepared for each of the composite membranes.

A long-term reverse osmosis test was conducted on an aqueous solution containing 5,000 ppm of CaCl$_2$, 1,000 ppm of NASF and 20 ppm of a floating solid composed mainly of a styrene/butadiene copolymer rubber (5 microns under and 0.45 micron on in a millipore filter) using these samples.

This reverse osmosis test was performed continuously for 30 minutes under the same conditions as described in Example 4, and the flux and rejection were measured at predetermined times.

The temperature of the test solution was adjusted so that it was 30° C. at the time of passing through the membrane surface. The results are shown in Table 7.

Furthermore, twice in a day, the test solution was maintained at 60° C. for 1 hour to reclaim the membrane surface with hot water. Otherwise, the same procedure as above was repeated. The results are shown in Table 8.

TABLE 7

| Test items | 1 hour later | 10 days later | 20 days later |
| --- | --- | --- | --- |
| Flux (gfd) | 40.0 | 33.0 | 17.0 |
| Rejection (%) | | | |
| CaCl$_2$ | 35.0 | 48.0 | 54.0 |
| NASF | 98.0 | 98.5 | 99.0 |

The results given in Table 7 demonstrate that the composite membrane crosslinked with the polyalicyclic dicarbonyl chloride of the invention can remove an organic polar substance selectively at a high rejection from an aqueous solution containing the organic polar substance and an inorganic salt as is the case with the composite membrane crosslinked with the polyalicyclic dissocyanate described hereinabove. The reduction in flux and selective rejection with time was due to the adhesion of the floating solid in the test solution to the membrane surface.

TABLE 8

| | 1 hour later | | 10 days later | | 20 days later | | 30 days later | |
| --- | --- | --- | --- | --- | --- | --- | --- | --- |
| Test items | Invention | Comparison | Invention | Comparison | Invention | Comparison | Invention | Comparison |
| Flux (gfd) | 40.0 | 40.0 | 38.0 | 48.0 | 37.0 | 53.0 | 37.0 | 54.0 |
| Rejection | | | | | | | | |

TABLE 8-continued

| | 1 hour later | | 10 days later | | 20 days later | | 30 days later | |
|---|---|---|---|---|---|---|---|---|
| Test items | In-vention | Com-parison | In-vention | Com-parison | In-vention | Com-parison | In-vention | Com-parison |
| (%) | | | | | | | | |
| CaCl$_2$ | 35.0 | 35.0 | 35.5 | 26.0 | 35.5 | 16.0 | 36.0 | 10.0 |
| NASF | 98.0 | 98.0 | 97.5 | 92.0 | 97.5 | 83.0 | 97.0 | 70.0 |

In the tests shown in Table 7, the membranes were reclaimed in a customary manner by acid (a 6% aqueous solution of citric acid, at 30° C. for 1 hour) and by low pressure flush (for 1 hour at an operating pressure of 5 kg/cm$^2$) 30 days after the start of the testing. The regaining of the flux was only 10%. In contrast, when the membranes were reclaimed by hot water, the reduction of the flux was only slight even after a lapse of 30 days, and the membranes could still fully withstand use. Furthermore, in the example of the present invention, the rejection values of CaCl$_2$ and NASF did not decrease by continuous operation but were maintained at satisfactory levels and high selectivity. On the other hand, in the comparative example, the rejections of these substances decreased as the time passed, and the membrane was deteriorated and was useless according to the test results determined 30 days later.

EXAMPLE 6

The 1% aqueous solution of polyepichlorohydrin modified with ethylenediamine which had been prepared in Example 2 was filtered by a No. 2 filter paper, and poured onto a film-like substrate of polysulfone prepared by the same operation as in Example 1. After dipping for 10 minutes, the aqueous solution was removed, and the substrate was contacted for 10 minutes with a hexane solution of 2 or 3; 6 or 7-dichlorocarbonyl perhydro-1,4-9,10-dimethanoanthracene

in a concentration of 6.0 millimoles/liter of hexane as a crosslinking agent. The solution was removed, and the substrate was heated for 10 minutes in a forced air circulating-type oven (110° C.) to produce a composite membrane of this invention. In the same way as above, a composite membrane of comparison was prepared by using 2 or 3; 6 or 7-dimethanoisocyanate perhydro-1,4; 9,10-dimethanoanthracene as a crosslinking agent.

A reverse osmosis test was performed on an actual effluent from the outlet of an activated sludge tank in a synthetic rubber plant. This effluent contained 6000 ppm of an inorganic salt mixture consisting of NaCl, CaCl$_2$, Al$_2$SO$_4$ and NaClO, 100 ppm of COD components including unreacted monomers and other organic compounds and 100 ppm of a floating solid composed mainly of the residue of activated sludge.

The operation was performed continuously for 20 days under the same conditions as in the experiment of Example 5 in which reclamation by hot water was performed. The results are shown in Table 9. The concentration of the inorganic salts was determined from the measurement of their specific electric conductivity. Since NaCl was a major component, the concentration of the inorganic salts was expressed as that of NaCl.

TABLE 9

| | 1 hour later | | 10 days later | | 20 days later | |
|---|---|---|---|---|---|---|
| Test items | In-vention | Com-parison | In-vention | Com-parison | In-vention | Com-parison |
| Flux (gfd) | 16.0 | 15.0 | 15.5 | 30.0 | 15.0 | 36.0 |
| Rejection (%) | | | | | | |
| NaCl | 37.0 | 37.0 | 37.5 | 20.0 | 37.5 | 19.0 |
| COD components | 97.5 | 97.5 | 97.5 | 93.0 | 97.0 | 92.5 |

The results shown in Table 9 were obtained as follows: The flux of each of the 10 membranes was measured after 1 hour from the starting of the test. Membranes showing the largest and second largest values and the smallest and second smallest values were excluded, and the average of the measured values of the remaining six membranes was calculated. The membrane which showed a flux value nearest to this average value was continuously operated, and the results obtained with this membrane are shown in Table 9.

It is seen from the results of Table 9 that in the comparison, both the flux and rejection changed as a result of one-hour hot water reclamation twice a day, whereas in the example of the invention, there was hardly no such change, and the membrane had good resistance to a kind of deterioration by hot water reclamation.

Whether the purpose is to bring the effluent into conformity to the statutory environmental standards or to recover COD, the comparative example can achieve it only unstably but the example of the invention can achieve it with good stability. Accordingly, when the membrane of this invention is used, it is easy to set down standards for treating waste waters. Furthermore, since the amounts and qualities of recovered COD components are always constant, it is easy to form a plan of reutilizing the waste waters.

What we claim is:

1. A process for preparing a semipermeable membrane, which comprises contacting a thin polyamine film applied to a liquid-permeable microporous substrate with a polyalicyclic diisocyanate or polyalicyclic dicarbonyl halide capable of reacting with the amino or imino groups in the polyamine, thereby to crosslink the polyamine at the surface portion of the thin film.

2. The process of claim 1 wherein the thin polyamine film is contacted with a solution of the polyalicyclic diisocyanate or polyalicyclic dicarbonyl halide.

3. The process of claim 2 wherein the solvent of the solution has a solubility parameter of 6.9 to 8.7.

4. The process of claim 1 in which the thin polyamine film comprises polyethylenimine.

5. The process of claim 1 in which the thin polyamine film comprises polyether polyamine.

6. The process of claim 1 wherein a polyalicyclic diisocyanate is used as the crosslinking agent.

7. The process of claim 6 wherein the polyalicyclic diisocyanate is a compound of the formula (III):

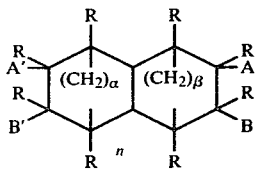

(III)

wherein R's are identical or different, and represent a hydrogen atom or a methyl group; one of A and B represents a methyl isocyanate group, and the other represents a hydrogen atom; one of A' and B' represents a methyl isocyanate group, and the other represents a hydrogen atom; n is 0, 1, 2 or 3; and $\alpha$ and $\beta$ are each 0 or 1, with the proviso that when n is 0, $\beta$ is 1 or 2.

8. The process of claim 1 wherein a polyalicyclic dicarbonyl halide is used as the crosslinking agent.

9. The process of claim 8 wherein the polyalicyclic dicarbonyl halide is a compound of the formula (III):

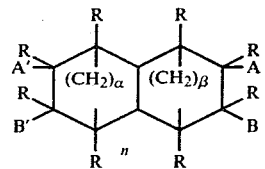

wherein R's are identical or different, and represent a hydrogen atom or a methylgroup; one of A and B represents a halocarbonyl group-COX, wherein X is halogen, and the other represents a hydrogen, atom; one of A' and B' represents a halocarbonyl group-COX, wherein X is halogen, and the other represents a hydrogen atom; n is 0, 1, 2 or 3; and $\alpha$ and $\beta$ are each 0 or 1, with the proviso that when n is 0, $\beta$ is 1 or 2.

10. A semipermeable membrane when produced by the process of claim 1.

11. A method of separating an organic polar substance from an aqueous solution of the organic polar substance and an inorganic salt which comprises subjecting the aqueous solution to reverse osmosis by contacting the aqueous solution with one surface of the semi-permeable membrane of claim 10.

* * * * *